Patented May 19, 1925.

1,538,369

UNITED STATES PATENT OFFICE.

BUICHI AKIYAMA, OF OSAKA-FU, JAPAN.

METHOD OF PRESERVING MEATS, MILK, VEGETABLES, FRUITS, AND OTHER EDIBLES.

No Drawing.   Application filed February 11, 1924.   Serial No. 692,194.

*To all whom it may concern:*

Be it known that I, BUICHI AKIYAMA, chemical engineer, a subject of His Majesty the Emperor of Japan, residing at No. 2622 Tennoji-mura, Higashinari-gun, Osaka-fu, Japan, have invented certain new and useful Improvements in Methods of Preserving Meats, Milk, Vegetables, Fruits, and Other Edibles, of which the following is a specification.

This invention relates to an improved method of preserving meats, milk, vegetables, fruits and other edibles, and has for its object their preservation in fresh state for a comparatively long time, free from alteration either in colour or taste, the tissues or fibres remaining soft.

According to this invention, meat or other food is placed in a closed vessel into which nitrous oxide or a mixture of nitrous oxide and carbon dioxide is introduced under pressure, and the meat or other food is kept in such a gaseous atmosphere.

It is already known that meats are sterilized by the action of ozone or hydrogen peroxide, both of which easily isolate oxygen. The fact that they can be preserved in gaseous carbon dioxide is also known. Meats preserved by such means, however, gradually lose their original colour and taste due to the chemical changes occurring in their muscle tissues. This invention aims to obviate these defects. It consists in using nitrous oxide or the mixture of nitrous oxide and carbon dioxide.

Nitrous oxide ($N_2O$) resembles chloroform in its sterilizing effect and is almost insoluble in hot water. It has no unpleasant odour and has a sweetish taste. A small quantity of the same, when inhaled, will not act injuriously to human body at all. Moreover such amount of the gas as has been absorbed and is retained in the preserved food according to this invention goes out when the food is boiled or roasted. Therefore, no apprehension need be entertained on sanitary grounds.

Nitric oxide (NO) cannot be used as a substitute for nitrous oxide. The former having a low power of sterilization, meats when stored in this gas cannot be preserved more than three days in hot weather. Moreover nitric oxide within the tissue of the meat upon coming into contact with atmospheric air will be oxidized to nitrogen trioxide ($N_2O_3$) and nitrogen peroxide ($NO_2$), and these oxides acting with water, will produce nitrous and nitric acids which change the taste and odour of the meat and are poisonous.

When meats are preserved in carbon dioxide only, bacteria and parasite's eggs are killed and putrefaction is prevented; but as is well known muscles become hard and dark-coloured and their nourishing value is diminished considerably.

If, however, a mixture of nitrous oxide and carbon dioxide in the proportion of 70 per cent of the former to 30 per cent of the latter is used, the gas mixture will possess a remarkable power of sterilization, and muscles of the meat will neither become hard or soft nor change colour and will be preserved in fresh state for a long time.

According to this invention bacteria and parasites that deteriorate foodstuffs are killed or, if not killed, are rendered harmless whether they be outside or inside the structure of the meats or other foods. This invention may be applied to meat which has been treated with ozone or hydrogen peroxide, as is the case with Australian meat. Moreover this invention is applicable to meat or other food stuff which has been treated with flavours or preservatives.

By way of example the following practical mode of carrying out the invention may be described. First blood should be sufficiently drawn from the muscle tissues or veins of fresh meat. Then if so desired a mixed solution of flavours consisting of pepsine, sodium glutaminate and the like and preservatives such as mustard oil, cinnamate or the like may be injected into the tissues or veins at appropriate temperature under pressure. Then aqueous solution of nitrous oxide or of approximately 70% nitrous oxide and 30 per cent of carbon dioxide saturated under a pressure of 100–200 pounds is injected into the muscle tissues or veins of the meat. The meat thus treated is now placed in a leak-tight iron vessel connected with a suction pump into which after pumping the air out nitrous oxide or the mixture of nitrous oxide and 30 per cent of carbon dioxide is sent under pressure until the inner pressure of about 500–600 pounds is attained. After maintaining such pressure for ten hours, gas is pumped out and fresh nitrous oxide or the mixture of nitrous oxide and carbon dioxide is introduced into the vessel under pressure until an inner pressure of about 300 pounds is reached. The meats are preserved in this state and if the gas is thereafter renewed at an interval ranging from seven to fourteen days depending upon the surrounding temperature, it will be possible to preserve meats for a period varying from two to three months in almost fresh condition.

It should be observed that there is no reason to limit the application of this invention to the preservation of meat only, although in the above the description of the invention has been mainly confined to the case of meat. Other food stuffs, such as milk, beverages, fruits or vegetables may equally be the object of storage according to this invention.

Having now particularly described and ascertained the nature of my said invention and in what manner the same is to be performed, I declare that what I claim is:—

1. Method of preserving meats, milk, vegetables, fruits and other edibles, which comprises storing the same in an atmosphere consisting essentially of nitrous oxide and carbon dioxide in the proportion of 70% of nitrous oxide to 30% of carbon dioxide under superatmospheric pressure of about 300 pounds.

2. Method of preserving meats, milk, vegetables, fruits and other edibles which comprises injecting thereinto an aqueous solution containing nitrous oxide saturated under a pressure of 100–200 pounds and thereafter storing the same in an atmosphere containing nitrous oxide under superatmospheric pressure of about 300 pounds.

3. Method of preserving meats, milk, vegetables, fruits and other edibles which comprises injecting thereinto an equeous solution of nitrous oxide and carbon dioxide saturated under a pressure of 100–200 pounds and thereafter storing the same in an atmosphere of 70% of nitrous oxide and 30% of carbon dioxide under superatmospheric pressure of about 300 pounds.

4. Method of preserving meats, milk, vegetables, fruits and other edibles which comprises first treating the said foodstuffs with flavoring and preservative materials, then injecting thereinto an aqueous solution of nitrous oxide and carbon dioxide in the proportion of 70% of nitrous oxide to 30% of carbon dioxide saturated under a pressure of 100–200 pounds, then placing said foodstuffs in a closed vessel and exhausting air therefrom, then introducing a mixture of 70% of nitrous oxide and 30% carbon dioxide into said vessel under pressure until the inner pressure attains to 500–600 pounds, then maintaining said pressure for about ten hours, finally pumping out said gas and introducing a fresh mixture of nitrous oxide and carbon dioxide of said proportion into the vessel under pressure until the inner pressure reaches 300 pounds, and maintaining this pressure.

5. Method of preserving meats, milk, vegetables, fruits and other edibles which comprises first treating said foodstuffs with flavoring and preservative materials, then injecting thereinto an aqueous solution containing nitrous oxide saturated under a pressure of 100–200 pounds, then placing said foodstuffs in a closed vessel and exhausting air therefrom, then introducing a gas comprising nitrous oxide into said vessel under pressure until the inner pressure attains to about 500–600 pounds, then maintaining said pressure for about ten hours, finally pumping out said gas and introducing a fresh nitrous oxide containing gas into the vessel under pressure until the inner pressure reaches about 300 pounds, and maintaining this pressure.

In testimony whereof, I affix my signature.

BUICHI AKIYAMA.

Witnesses:
G. DGATA,
H. YOUERCHITA.